United States Patent
Oi et al.

(10) Patent No.: US 12,547,128 B2
(45) Date of Patent: Feb. 10, 2026

(54) ADJUSTMENT SYSTEM, ADJUSTMENT METHOD, AND ADJUSTMENT PROGRAM

(71) Applicant: NEC Corporation, Tokyo (JP)

(72) Inventors: Norihito Oi, Tokyo (JP); Riki Eto, Tokyo (JP); Yuki Chiba, Tokyo (JP); Shinichi Takeda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 420 days.

(21) Appl. No.: 18/023,308

(22) PCT Filed: Aug. 27, 2020

(86) PCT No.: PCT/JP2020/032340
§ 371 (c)(1),
(2) Date: Feb. 24, 2023

(87) PCT Pub. No.: WO2022/044191
PCT Pub. Date: Mar. 3, 2022

(65) Prior Publication Data
US 2023/0333518 A1    Oct. 19, 2023

(51) Int. Cl.
*G05B 13/02*    (2006.01)
(52) U.S. Cl.
CPC ................... *G05B 13/0265* (2013.01)
(58) Field of Classification Search
None
See application file for complete search history.

(56) References Cited

U.S. PATENT DOCUMENTS

2018/0011488 A1*   1/2018   Nishi .................. G05D 1/0221

FOREIGN PATENT DOCUMENTS

| JP | 2016-522940 A | 8/2016 |
| JP | 2019-109556 A | 7/2019 |

OTHER PUBLICATIONS

International Search Report for PCT Application No. PCT/JP2020/032340, mailed on Nov. 17, 2020.
Written opinion for PCT Application No. PCT/JP2020/032340, mailed on Nov. 17, 2020.
Riki Eto et al., "Intention learning technology that imitates expert decision making", NEC Technical Journal, 2019, vol. 72, No. 1, pp. 95-98.

* cited by examiner

*Primary Examiner* — Sean Shechtman
(74) *Attorney, Agent, or Firm* — Sughrue Mion, PLLC

(57) ABSTRACT

An input unit 81 receives inputs of pre-change performance data acquired by a device before a change and post-change performance data acquired by the device after having undergone the change, through control using a first cost function. An update unit 82 generates a second cost function obtained by updating the first cost function in such a way as to reduce a difference between the pre-change performance data and the post-change performance data. In the process, the update unit 82 generates the second cost function obtained by updating the first cost function by estimating an error that occurs in an output value of the device included in the first cost function before and after the change to the device.

6 Claims, 7 Drawing Sheets

ADJUSTMENT SYSTEM, ADJUSTMENT METHOD, AND ADJUSTMENT PROGRAM

This application is a National Stage Entry of PCT/JP2020/032340 filed on Aug. 27, 2020, the contents of all of which are incorporated herein by reference, in their entirety.

TECHNICAL FIELD

The present invention relates to an adjustment system, an adjustment method, and an adjustment program for adjusting the control contents of a system including a device to be controlled.

BACKGROUND ART

In recent years, there have been proposed various methods of controlling devices by imitating the operations of skilled persons in robot control and so on. For example, Patent Literature 1 describes a method of constructing a learning model for improving the accuracy in selecting an object extraction position. In the method described in Patent Literature 1, a learning model is constructed by performing supervised machine learning using teacher data where an evaluation value is assigned to the point cloud information for matching, in which the object extraction position taught by the user for a distance image is associated with the image data in the vicinity of the object.

CITATION LIST

Patent Literature

PTL 1: Japanese Unexamined Paten Application Publication No. 2019-109556

SUMMARY OF INVENTION

Technical Problem

In the system described in Patent Literature 1, the image processing device and the robot control device assume that the machine coordinate system for controlling the robot is associated with the object extraction position (camera coordinate system) through calibration performed in advance. Therefore, in the case where the environment at the time of learning is different from the environment at the time of control, such as when the position of the camera is changed or a new camera is used, the system may not be able to control the devices appropriately.

In such a situation, it is necessary to modify the parameters of various sensors and the parameters of the model that performs the control. The characteristics of the sensor or actuator to be changed are often unknown, however, and therefore it may be necessary to verify the parameters of the device by itself when making some change to the device. Furthermore, the characteristics of the device itself may change depending on the surrounding environmental conditions. Therefore, it is necessary to consider the trade-offs among various factors for the adjustment, which leads to a problem that the adjustment of the parameters requires a lot of time.

Therefore, it is an exemplary object of the present invention to provide an adjustment system, an adjustment method, and an adjustment program capable of efficiently adjusting parameters in response to changes in situations.

Solution to Problem

An adjustment system according to the present invention includes: an input unit that receives inputs of pre-change performance data acquired by a device before a change and post-change performance data acquired by the device after having undergone the change, through control using a first cost function; and an update unit that generates a second cost function obtained by updating the first cost function in such a way as to reduce a difference between the pre-change performance data and the post-change performance data, wherein the update unit generates the second cost function obtained by updating the first cost function by estimating an error that occurs in an output value of the device included in the first cost function before and after the change to the device.

An adjustment method according to the present invention includes: receiving inputs of pre-change performance data acquired by a device before a change and post-change performance data acquired by the device after having undergone the change, through control using a first cost function; generating a second cost function obtained by updating the first cost function in such a way as to reduce a difference between the pre-change performance data and the post-change performance data; and generating the second cost function obtained by updating the first cost function by estimating an error that occurs in an output value of the device included in the first cost function before and after the change to the device at the time of generating the second cost function.

An adjustment program according to the present invention causes a computer: to perform an input process of receiving inputs of pre-change performance data acquired by a device before a change and post-change performance data acquired by the device after having undergone the change, through control using a first cost function, and an update process of generating a second cost function obtained by updating the first cost function in such a way as to reduce a difference between the pre-change performance data and the post-change performance data; and to generate the second cost function obtained by updating the first cost function by estimating an error that occurs in an output value of the device included in the first cost function before and after the change to the device in the update process.

Advantageous Effects of Invention

The present invention provides efficient adjustment of parameters in response to changes in situations.

DESCRIPTION OF EMBODIMENT

Hereinafter, the exemplary embodiments of the present invention will be described with reference to the drawings. In this exemplary embodiment, it is supposed that there is a system where changes are made in the mounted devices (for example, a sensor, an actuator, and the like) and where these devices or cost functions (reward functions) used to control these devices need to be adjusted. The changes here include, for example, changing the type of the sensor, or changing the mounting position or angle. In the following description, this type of system is referred to as "adjustment target system."

An example of an adjustment target system is a robot arm. The robot arm is equipped with, for example, a camera for measuring the distance to a physical object, a pressure sensor used to grip an object, an actuator for driving the arm, and the like. Cost functions are used to control these devices. In this exemplary embodiment, description is made on a method of adjusting cost functions with consideration for the entire adjustment target system in the case where changes are made in the camera, pressure sensor, actuator, and the like.

The adjustment target system of this exemplary embodiment, however, is not limited to a robot arm. For example, systems in various fields, such as a device that automatically determines a person or a vehicle that performs automatic driving, can be the target of the adjustment system of this exemplary embodiment.

Figure 1:
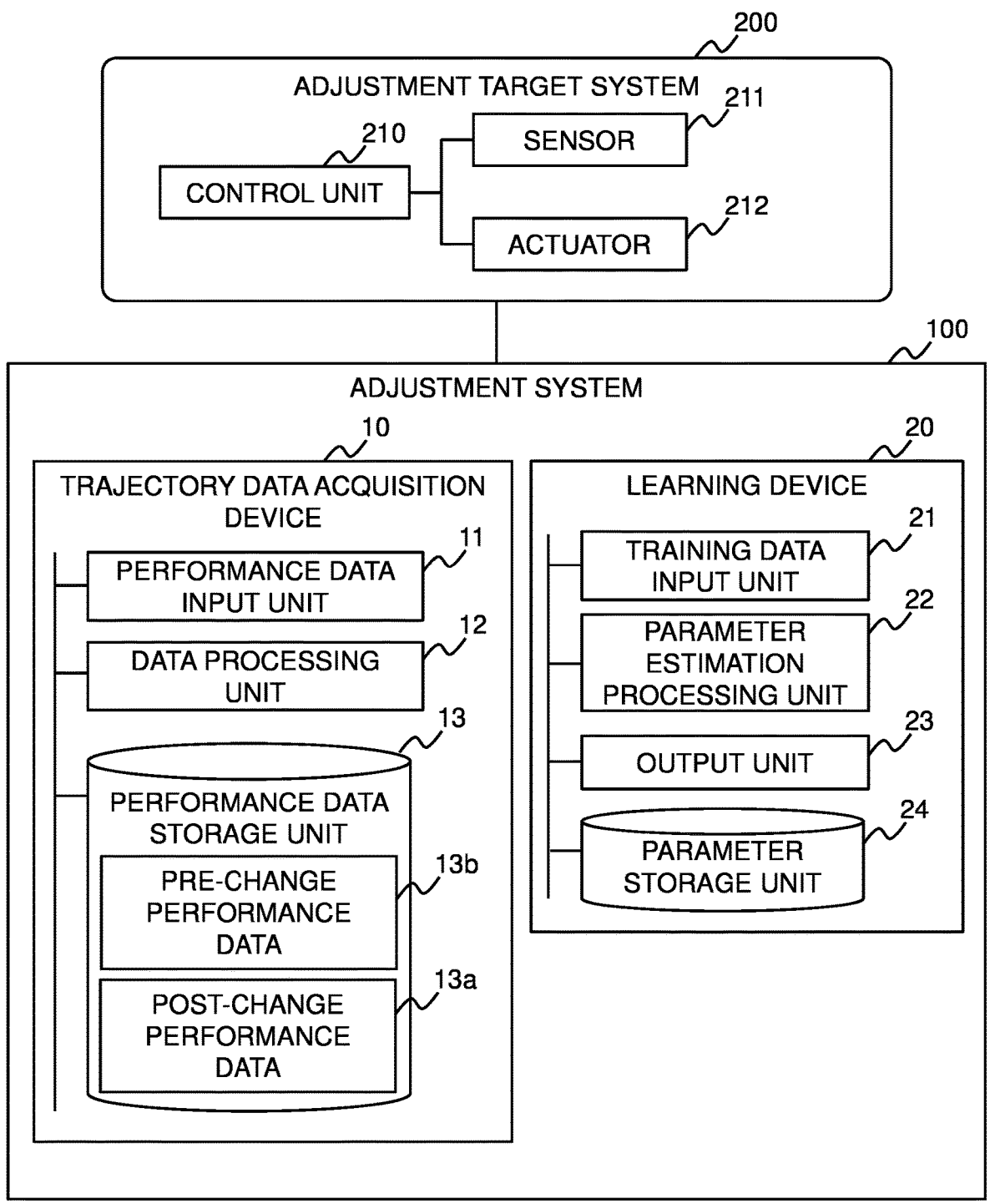
FIG. 1 It depicts a block diagram illustrating an example configuration of an exemplary embodiment of an adjustment system according to the present invention.

FIG. 1 is a block diagram illustrating an example configuration of one exemplary embodiment of the adjustment system according to the present invention. An adjustment system 100 of this exemplary embodiment is connected to an adjustment target system 200 and gives information on various values necessary for adjustment. The adjustment system 100 also acquires performance data measured in the adjustment target system 200.

In the following, two phases (hereinafter, referred to as a first phase and a second phase) are supposed. The first phase is a phase in which performance data is measured with the performances of various sensors included in the adjustment target system 200 being known. The performance data measured in the first phase is referred to as pre-change performance data. The second phase is a phase in which the performance data is measured with various sensors included in the adjustment target system 200 having undergone changes. The performance data measured in the second phase is referred to as post-change performance data.

The performance data is a set of actual values acquired in the environment before or after the change in the sensor, or the like, and can be called trajectory data indicating the operation of the adjustment target system 200. In this exemplary embodiment, the measured performance data is assumed to be trajectory data that includes the observed state and the actions in which the operations or the like taken by a skilled person or the like have been performed for that state. In other words, the actual values can also be called series data of states and actions in inverse reinforcement learning.

For example, in the case of a robot arm, information that represents the state of the arm includes camera images, the coordinates and axis angle of each arm joint, and speed (rotation speed). In addition, the actions include the angle of each joint in the actuator, the distance between the arm and the physical object in the camera, and so on.

In this exemplary embodiment, it is assumed that the pre-change performance data is trajectory data in an ideal state with a known sensor or the like operating without any problems, and the post-change performance data is trajectory data with the sensor or the like having undergone the change (for example, an unknown sensor or the like) and without showing the ideal motion. In this exemplary embodiment, the goal is to update the cost function so that the post-change performance data is closer to the pre-change performance data.

The adjustment target system 200 includes a control unit 210, a sensor 211, and an actuator 212. The sensor 211 and the actuator 212 included in the adjustment target system 200 illustrated in FIG. 1 are merely examples of a sensor and the like to be changed, and the objects to be changed are not limited to the sensor and actuator.

The control unit 210 controls various actuators (the actuator 212 in the example illustrated in FIG. 1) of the adjustment target system 200 by using a cost function for control (more specifically, by optimizing the cost function). The control unit 210 may also control the various actuators on the basis of a predetermined control logic. The control unit 210 receives adjustment values adapted to the changed environment, which is obtained by the processing of the adjustment system 100 described later, and controls the various actuators of the adjustment target system 200 by using the cost function changed based on the received adjustment values.

In addition, the control unit 210 acquires performance data from each device obtained by controlling with the cost function and outputs the performance data to the adjustment system 100. Specifically, the control unit 210 generates pre-change performance data and outputs the pre-change performance data to the adjustment system 100 in the first phase, and generates post-change performance data and outputs the post-change performance data to the adjustment system 100 in the second phase. The control unit 210 may store the performance data in an external storage (not illustrated) that is separate from the adjustment system 100.

The control unit 210 is implemented, for example, by various control units. The control unit 210 may be implemented, for example, by various general-purpose computer processors (for example, a central processing unit [CPU] and a graphics processing unit [GPU]), or by dedicated control units (for example, an engine control unit [ECU] and the like in the case of an automobile).

The adjustment system 100 includes a trajectory data acquisition device 10 and a learning device 20.

The trajectory data acquisition device 10 includes a performance data input unit 11, a data processing unit 12, and a performance data storage unit 13.

The performance data input unit 11 receives the input of the performance data generated by the adjustment target system 200. The performance data input unit 11 may receive the input of the performance data directly from the adjustment target system 200 or may acquire and input the performance data from the external storage (not illustrated) described above.

The data processing unit 12 processes the performance data to generate data (training data) in a format able to be used for learning by the learning device 20 described later. The data processing unit 12 is able to use an arbitrary method for processing the training data. For example, the training data processing method includes standardization of data format, data cleansing, and feature generation. The features (explanatory variables) used for the training data are designed in advance, and the data processing unit 12 only needs to generate the designed features on the basis of the input performance data.

The performance data storage unit 13 stores pre-change performance data 13b and post-change performance data 13a. The performance data storage unit 13 may store training data processed from the pre-change performance data 13b and training data processed from the post-change performance data 13a. The performance data storage unit 13 is implemented by, for example, a magnetic disk or the like.

The learning device 20 includes a training data input unit 21, a parameter estimation processing unit 22, an output unit 23, and a parameter storage unit 24.

The training data input unit 21 receives the input of training data from the trajectory data acquisition device 10. The training data input unit 21 may directly receive the input of training data generated by the data processing unit 12, or may acquire and input the training data from the performance data storage unit 13.

In addition, the training data input unit 21 may perform the data processing, which is performed by the data processing unit 12. In this case, the training data input unit 21 may receive the inputs of pre-change performance data and post-change performance data from the trajectory data acquisition device 10.

The parameter estimation processing unit 22 estimates the parameter of the cost function by using the input training data. The operation of the parameter estimation processing unit 22 is described below, with being divided into the first phase and the second phase.

In the first phase, the parameter estimation processing unit 22 estimates the parameter of the cost function by learning the cost function by using the training data created based on the pre-change performance data. In the following, the cost function learned based on the pre-change performance data is sometimes referred to as the pre-change cost function or as the first cost function.

Specifically, in the first phase, the parameter estimation processing unit 22 estimates the feature weight as the parameter of the cost function by using the training data created based on the pre-change performance data. The parameter estimation processing unit 22 may generate a cost function, for example, as illustrated in Equation 1 below, by machine learning.

[Math. 1]

$$\sum_{t=1}^{T} \{\lambda_s (s_t - \bar{s}_t)^2 + \dots \} \quad \text{(Equation 1)}$$

The cost function illustrated in Equation 1 is expressed as the sum of the difference between each measured sensor output (or a feature calculated based on the sensor output) $s_t$ and a target values $\bar{s}_t$ (superscript bar of s)$_t$ of each sensor output (or the feature described above), which may affect the control logic. In Equation 1, $\lambda_s$ is a parameter estimated by learning in the first phase, and is each feature weight.

The cost function illustrated in Equation 1 may be, for example, the cost function used to control the actuator 212.

In the first phase, the method by which the parameter estimation processing unit 22 estimates the parameter of the cost function is not particularly limited. For example, as described above, since the performance data of this exemplary embodiment is trajectory data that implements the ideal state (motion), the parameter estimation processing unit 22 may estimate the parameter of the cost function by inverse reinforcement learning.

In this exemplary embodiment, description has been made on the case in which the parameter estimation processing unit 22 learns the pre-change cost function in the first phase. The pre-change cost function may be generated in advance by another means other than the parameter estimation processing unit 22 in this exemplary embodiment and be stored in the parameter storage unit 24 described later. In this case, the parameter estimation processing unit 22 does not need to generate the cost function in the first phase.

Next, in the second phase, it is supposed that the device change causes an error before and after the device change in the output value of the device. Therefore, the parameter estimation processing unit 22 updates the pre-change cost function in such a way as to make the post-change performance data closer to the pre-change performance data (in other words, in such a way as to reduce the difference between the pre-change performance data and the post-change performance data). The cost function updated in this manner is hereinafter referred to as the post-change cost function or the second cost function.

In this case, the parameter estimation processing unit 22 does not change the already-estimated parameter (specifically, feature weight), but estimates the error that occurs before and after the device change in the output value (feature) of the device included in the pre-change cost function, and generates the post-change cost function.

For example, the parameter estimation processing unit 22 may first generate a cost function (post-change cost function) in which a variable indicating the error in the sensor output (an output value, or a feature calculated based on the sensor output) of the device caused by the change is set to the pre-change cost function. Then, the parameter estimation processing unit 22 may generate the post-change cost function by updating the variable in such a way as to reduce the difference between the pre-change performance data and the post-change performance data to estimate the error.

For example, suppose that the sensor output $s_t$ in Equation 1 described above changes by an error bias $\varepsilon_s$ due to a sensor change. That is, when the sensor output due to the sensor change is denoted as s~ (superscript tilde of s)$_t$, it is supposed that s~$_t$=$s_t$+$\varepsilon_s$ in relation to the original sensor output $s_t$.

In this case, the parameter estimation processing unit 22 may generate a post-change cost function illustrated in Equation 2 below, in which the feature bias $\varepsilon_s$ caused by the sensor change is set in the pre-change cost function.

[Math. 2]

$$\sum_{t=1}^{T} \{\lambda_s (\tilde{s}_t - \bar{s}_t - \varepsilon_s)^2 + \dots \} \quad \text{(Equation 2)}$$

Then, the parameter estimation processing unit 22 updates the post-change cost function in such a way as to reduce the difference between the pre-change performance data and the post-change performance data, while keeping $\lambda_s$ fixed, to estimate the bias $\varepsilon_s$.

The method by which the parameter estimation processing unit 22 estimates the error is not particularly limited. The parameter estimation processing unit 22 may estimate the error, for example, by generating a post-change cost function obtained by updating the pre-change cost function in the framework of inverse reinforcement learning using the pre-change performance data and the post-change performance data. In this case, the parameter estimation processing unit 22 may estimate the error, for example, by updating the cost function (specifically, the error such as a bias) in such a way as to reduce the difference between the pre-change performance data and the post-change performance data and repeating the process of updating the cost function in such a way as to reduce the difference between the decision-making data obtained by optimization or the like of the updated cost function and the pre-change performance data. As the method of updating the bias, there may be used, for example, a method using a gradient descent method (the bias $\varepsilon_s$ is differentiated and the process of updating the bias is repeated to reduce the difference between the data).

As a simple method, the parameter estimation processing unit 22 may estimate the error by grid search, for example. In the case where the number of biases to be estimated is large, however, the grid search is too expensive, and the use of the inverse reinforcement learning is preferable from the viewpoint of efficiency.

In this exemplary embodiment, description has been made on the method in which the parameter estimation processing unit 22 uses inverse reinforcement learning to estimate the bias $\varepsilon_s$, which corresponds to the so-called offset, as an error between the true value and the value measured by the sensor. In addition, a parameter corresponding to the so-called gain (hereinafter, referred to as the magnification parameter) may be taken into consideration as an error that occurs between the true value and the value measured by the sensor. For example, where k is the magnification parameter, the change of the sensor output is expressed as $s\sim_t = ks_t$. Then, the parameter estimation processing unit 22 may generate the post-change cost function by setting $s_t = s\sim_t/k$ to Equation 1 described above, as in the derivation of Equation 2 described above. Then, the parameter estimation processing unit 22 may estimate the magnification parameter, which corresponds to the so-called gain, as an error by inverse reinforcement learning using the generated post-change cost function. The error estimation may be performed for either one or both of the bias $\varepsilon_s$ and the magnification parameter k.

The parameter storage unit 24 stores the post-change cost function including the estimated error. The parameter storage unit 24 may also store information on the parameter of the pre-change cost function. The parameter storage unit 24 is implemented by, for example, a magnetic disk or the like.

The output unit 23 outputs an estimated error (specifically, a bias or a magnification parameter). The output unit 23 may also output the post-change cost function itself. Since the estimated error is a value used for adjusting the post-change performance data to be closer to the pre-change performance data, this error is able to be called the adjustment value. The output unit 23 may output this adjustment value to the adjustment target system 200 or store the adjustment value in the parameter storage unit 24.

Upon receiving this adjustment value (or post-change cost function), the adjustment target system 200 controls various actuators by using the adjusted (or post-change) cost function. In other words, it can be said that the adjustment target system 200 is able to implement the calibration after the device change only by updating the cost function used for control, without updating the parameters of the various actuators and the like.

The training data input unit 21, the parameter estimation processing unit 22, and the output unit 23 are implemented by computer processors (for example, a CPU, a GPU, and the like) that operate according to a program (adjustment program).

For example, the program may be stored in the storage unit (not illustrated) of the learning device 20, so that the processors read the program and operate according to the program as the training data input unit 21, the parameter estimation processing unit 22, and the output unit 23. The functions of the training data input unit 21, the parameter estimation processing unit 22, and the output unit 23 may be provided in a software-as-a-service (SaaS) format.

The training data input unit 21, the parameter estimation processing unit 22, and the output unit 23 may each be implemented by dedicated hardware. In addition, some or all of the components of each device may be implemented by general-purpose or dedicated circuitry, processors, or a combination thereof. These may be each composed of a single chip or a plurality of chips connected via a bus. Some or all of the components of each device may be implemented by a combination of the above-mentioned circuitry or the like and a program.

In the case where some or all of the components of the training data input unit 21, the parameter estimation processing unit 22, and the output unit 23 are implemented by a plurality of information processing devices, circuitries, and the like, the plurality of information processing devices, circuitries, and the like may be arranged in a centralized or decentralized manner. For example, the information processing devices, circuitries, and the like may be implemented as a client-server system, a cloud computing system, or the like, in which the devices and circuitries are connected via a communication network.

Figure 2:
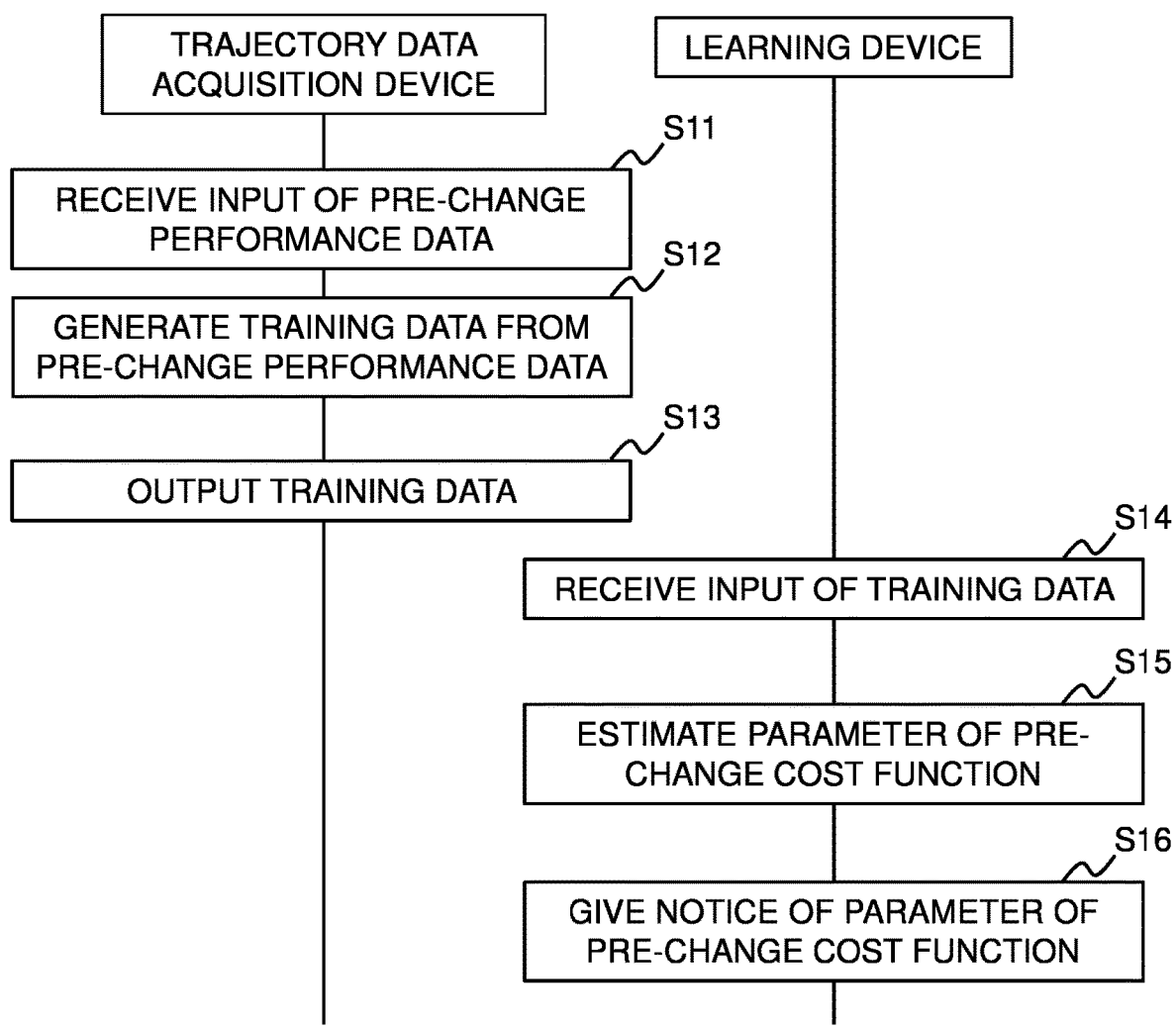
FIG. 2 It depicts a flowchart illustrating an operation example of the adjustment system.
Figure 3:
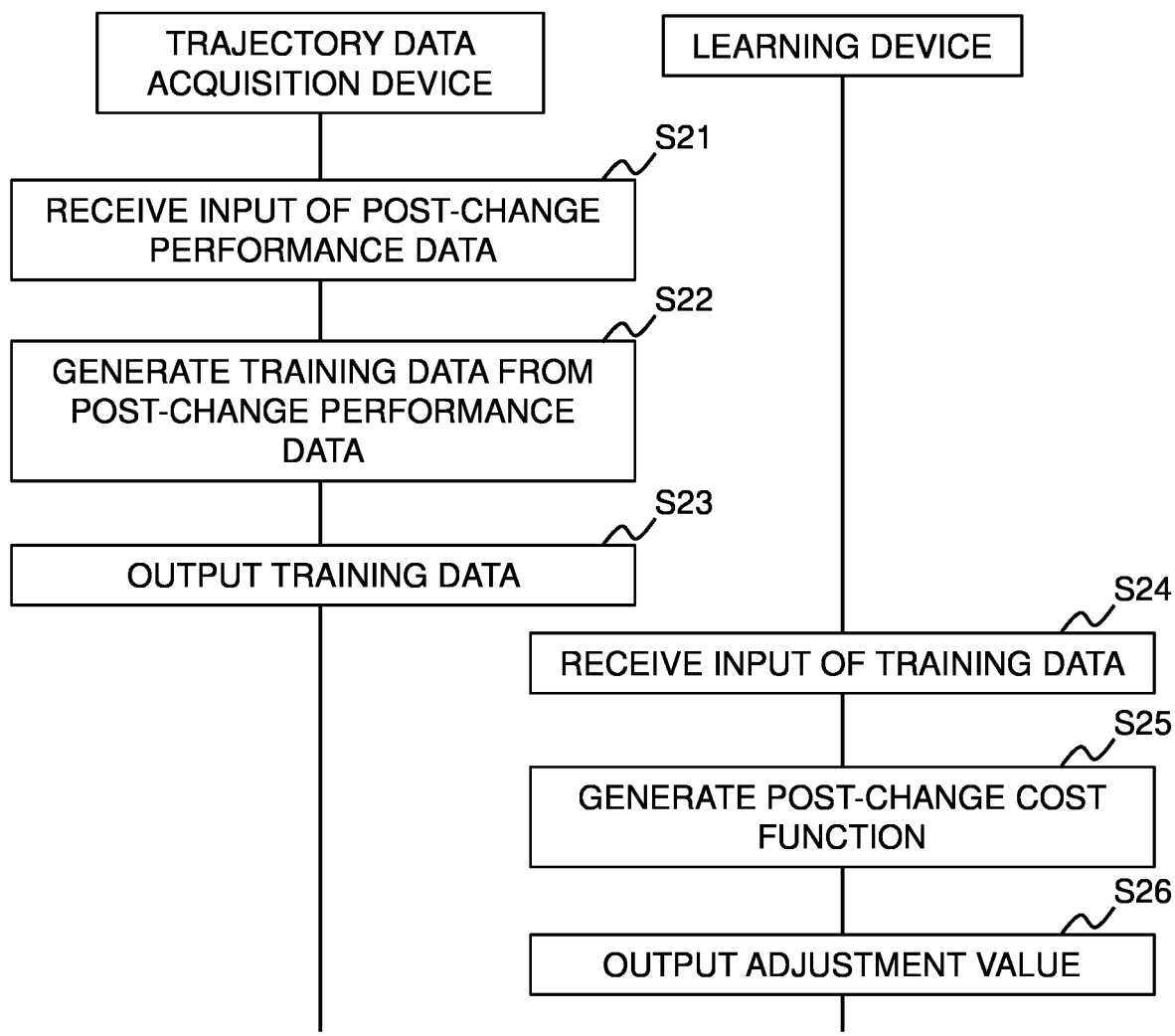
FIG. 3 It depicts a flowchart illustrating an operation example of the adjustment system.

Subsequently, the operation of the adjustment system of this exemplary embodiment will be described. FIGS. 2 and 3 are flowcharts each illustrating an operation example of the adjustment system 100 of this exemplary embodiment. FIG. 2 illustrates an operation example of the first phase, and FIG. 3 illustrates an operation example of the second phase. Specifically, the flowcharts illustrated in FIGS. 2 and 3 illustrate operations, in which the trajectory data acquisition device 10 generates training data from the performance data and the learning device 20 generates or updates the cost function, in both the first and second phases.

First, in the first phase, the performance data input unit 11 receives the input of pre-change performance data acquired by a device before a change from the adjustment target system 200 (step S11). The data processing unit 12 processes the pre-change performance data to generate training data (step S12) and outputs the generated training data to the learning device 20 (step S13).

Then, the training data input unit 21 receives the input of training data from the trajectory data acquisition device 10 (step S14). The parameter estimation processing unit 22 estimates the parameter of the pre-change cost function by learning the cost function by using the input training data (Step S15), and gives notice of the estimated parameter of the pre-change cost function to the adjustment target system 200 (step S16). Thereafter, the adjustment target system 200 acquires the pre-change performance data by using the estimated pre-change cost function and stores the pre-change performance data 13b in the performance data storage unit 13.

Subsequently, in the second phase, the performance data input unit 11 receives the input of post-change performance data acquired by the device after having undergone the change from the adjustment target system 200 (step S21). The data processing unit 12 processes the post-change performance data to generate training data (step S22) and outputs the generated training data to the learning device 20 (step S23).

Then, the training data input unit 21 receives the input of training data from the trajectory data acquisition device 10 (step S24). The parameter estimation processing unit 22 generates a post-change cost function obtained by updating the pre-change cost function in such a way as to reduce the difference between the training data generated from the pre-change performance data and the training data generated from the post-change performance data (step S25). Specifically, the parameter estimation processing unit 22 estimates an error that occurs before and after the device change in the output value of the device included in the pre-change cost function, and generates a post-change cost function obtained by updating the pre-change cost function. Then, the output unit 23 outputs the adjustment value, which is the estimated error, to the adjustment target system 200 (step S26).

Thereafter, the generated post-change cost function is used to perform control in the adjustment target system 200.

Figure 4:
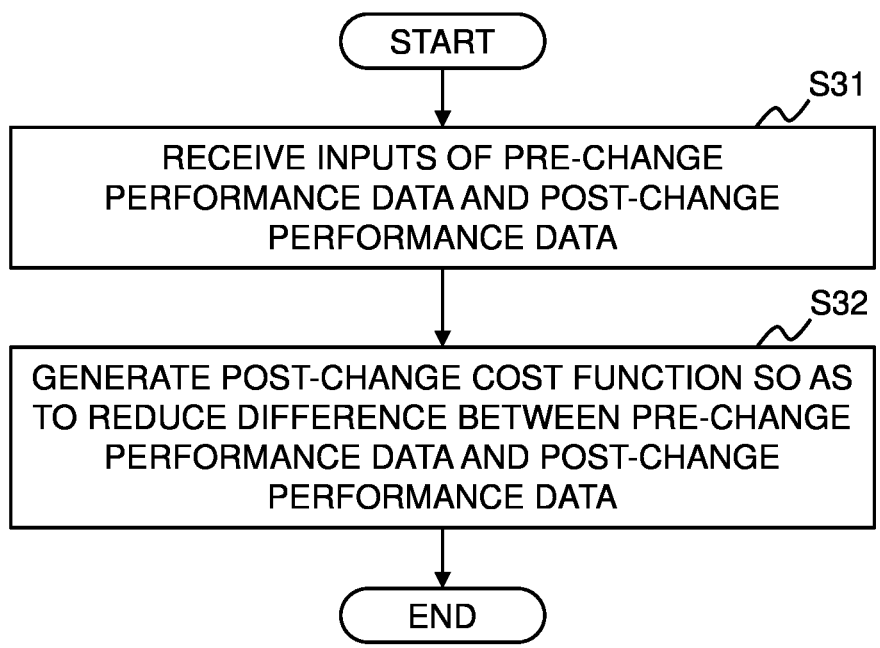
FIG. 4 It depicts a flowchart illustrating another operation example of the adjustment system.

The following describes an operation of the learning device 20 that directly receives the input of the performance data and learns the post-change cost function in the second phase. FIG. 4 is a flowchart illustrating another operation example of the adjustment system 100 of this exemplary embodiment.

The training data input unit 21 receives the inputs of pre-change performance data and post-change performance data (step S31). Then, the parameter estimation processing unit 22 generates a post-change cost function obtained by updating the pre-change cost function in such a way as to reduce the difference between the pre-change performance data and the post-change performance data (step S32). In this case, the parameter estimation processing unit 22 generates the post-change cost function by estimating an error that occurs before and after the device change in the output value of the device included in the pre-change cost function. Thereafter, the generated post-change cost function is used to perform control in the adjustment target system 200.

As described above, in this exemplary embodiment, the training data input unit 21 receives the inputs of pre-change performance data and post-change performance data, and the parameter estimation processing unit 22 generates a post-change cost function obtained by updating a pre-change cost function in such a way as to reduce the difference between the pre-change performance data and the post-change performance data. In this case, the parameter estimation processing unit 22 generates the post-change cost function by estimating the error that occurs before and after the device change in the output value of a device included in the pre-change cost function. This enables efficient adjustment of parameters in response to changes in situations.

Specifically, in general, in the case where a device is changed, it is necessary to change the parameters of devices and the parameters of cost functions that control those devices, taking into consideration the influence of other parameters, depending on the performance of the changed device and the performances of the devices affected by the change. For example, in the general method, in the development of a robot arm or the like, it is necessary to adjust a number of parameters each time there is a change in the type of a sensor or an actuator, a change in the mounting position, or the like.

On the other hand, in this exemplary embodiment, the parameter estimation processing unit 22 generates a post-change cost function by reflecting an error estimated for the device change on the pre-change cost function. This reduces the time and effort required for calibration of the device by only updating the cost function.

In general, when the characteristics of each sensor are known and the model (cost function) is unknown, a design developer designs parameters by using simulation tools or the like and optimizes the parameters in actual control tests to create an appropriate model. This method is a so-called direct problem, but it is very difficult to design parameters for a problem with unknown sensor characteristics.

On the other hand, the adjustment system of this exemplary embodiment generates a model by solving a so-called inverse problem, in which the sensor, actuator, and other parameters are adjusted from an ideal motion. This enables an adjustment of parameters and so on at a low cost in response to changes in situations.

Figure 5:
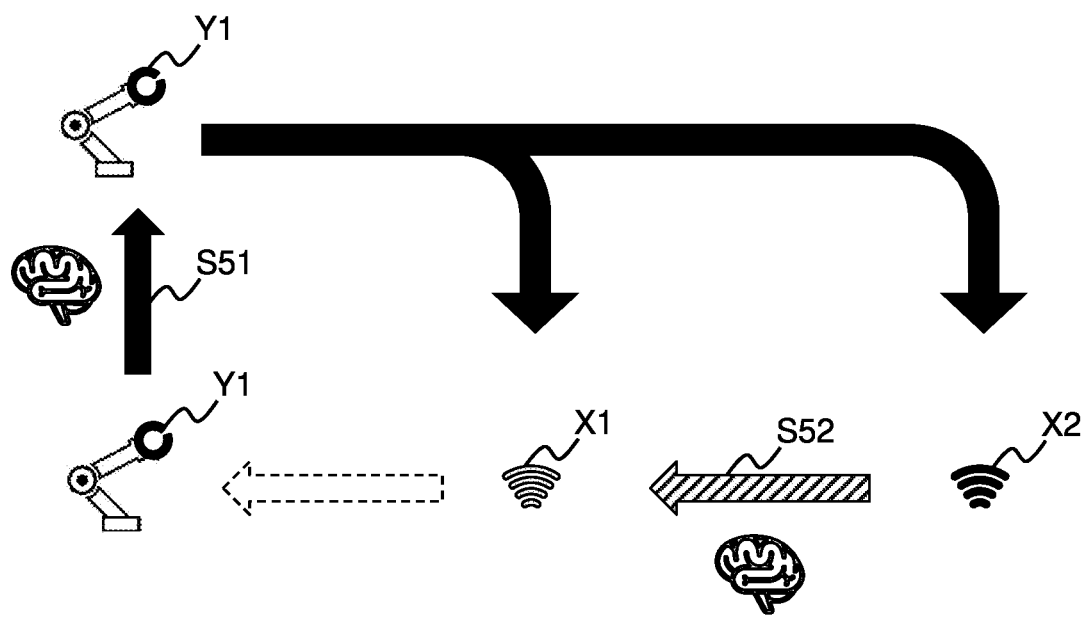
FIG. 5 It depicts an explanatory diagram illustrating an example of a design method using the adjustment system.

The following specifically describes an example of a design method using the adjustment system of this exemplary embodiment. FIG. 5 is an explanatory diagram illustrating an example of the design method using the adjustment system of this exemplary embodiment. In FIG. 5, there is illustrated a method of sensor setting, in which the parameter of the cost function is adjusted to be closer to the known sensor characteristics from the ideal motion of the robot arm.

In step S51, the learning device 20 estimates the parameter of the cost function of the robot arm Y1 on the basis of the known characteristics of the sensor X1 by machine learning (for example, inverse reinforcement learning). This corresponds to the first phase processing described above. The black arrows in FIG. 5 represent the motion implemented by the estimated parameter $\lambda$. Note that $\lambda$ corresponds to a parameter directly related to action planning or to a device control logic such as, for example, the levels of a camera, a millimeter wave, or a range finder.

Thereafter, when the sensor X1 is changed to a sensor X2 whose characteristics are unknown in the adjustment target system 200, the learning device 20 estimates the bias $\varepsilon$ (the range, the level of setting of measurement interval or the like, and so on) of the sensor X2, to which the sensor is changed, by machine learning (for example, inverse reinforcement learning) in step S52. This corresponds to the second phase processing described above. This ensures that the motion of the unknown sensor X2 is the motion of the known sensor X1.

As described above, since the bias is estimated in the framework of the cost function learning process, the calibration is able to be implemented without being aware of the original sensor characteristics. This is particularly effective in situations where a plurality of sensors needs to be adjusted. In addition, in this exemplary embodiment, the characteristics of the unknown sensor X2 are able to be confirmed based on the characteristics of the known sensor X1 and the estimated bias $\varepsilon$, since the characteristics are confirmed later as a result of good tuning. For example, the output unit 23 outputs the difference between the pre-change cost function and the post-change cost function as an error, thereby enabling a user to confirm the characteristics of the unknown sensor X2, too.

Figure 6:
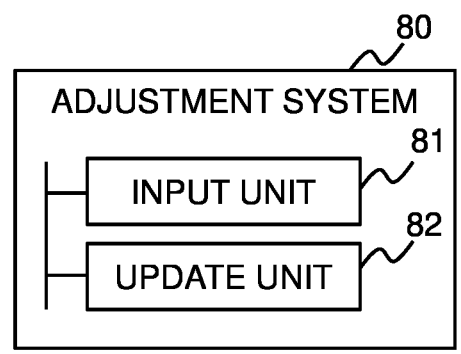
FIG. 6 It depicts a block diagram illustrating an overview of the adjustment system according to the present invention.

Next, the overview of the present invention is described. FIG. 6 is a block diagram illustrating the overview of the adjustment system according to the present invention. The adjustment system 80 according to the present invention includes an input unit 81 (for example, the training data input unit 21) that receives the inputs of pre-change performance data acquired (for example, by a skilled person) with a device before a change (for example, the sensor 211, the actuators 212, or the like) and post-change performance data acquired with a device after having undergone a change, through control using the first cost function (for example, the pre-change cost function), and an update unit 82 (for example, the parameter estimation processing unit 22) that generates a second cost function (for example, the post-change cost function) obtained by updating the first cost function in such a way as to reduce the difference between the pre-change performance data and the post-change performance data.

The update unit 82 estimates an error that occurs in the output value (for example, a feature) of the device included in the first cost function before and after the device change, and generates the second cost function obtained by updating the first cost function.

The above configuration enables efficient adjustment of parameters in response to changes in situations.

In addition, the update unit 82 may generate the second cost function (for example, Equation 2 described above) with a variable that indicate an error (for example, a bias, a magnification parameter, or the like) in the output value of the device included in the first cost function, and may generate the second cost function by estimating the error by updating the variable in such a way as to reduce the difference between the pre-change performance data and the post-change performance data.

The update unit 82 may also generate the second cost function obtained by updating the first cost function through inverse reinforcement learning using the pre-change performance data and the post-change performance data. This configuration enables efficient error estimation.

In this case, the update unit 82 may repeat the process of updating the second cost function in such a way as to reduce the difference between the decision-making data obtained by optimizing the generated second cost function and the pre-change performance data.

In addition, the variable indicating the error in the output value of the device may be one or both of the variable indicating the bias (for example, the variable c described above) and the variable indicating the magnification parameter (for example, the variable k described above).

Figure 7:
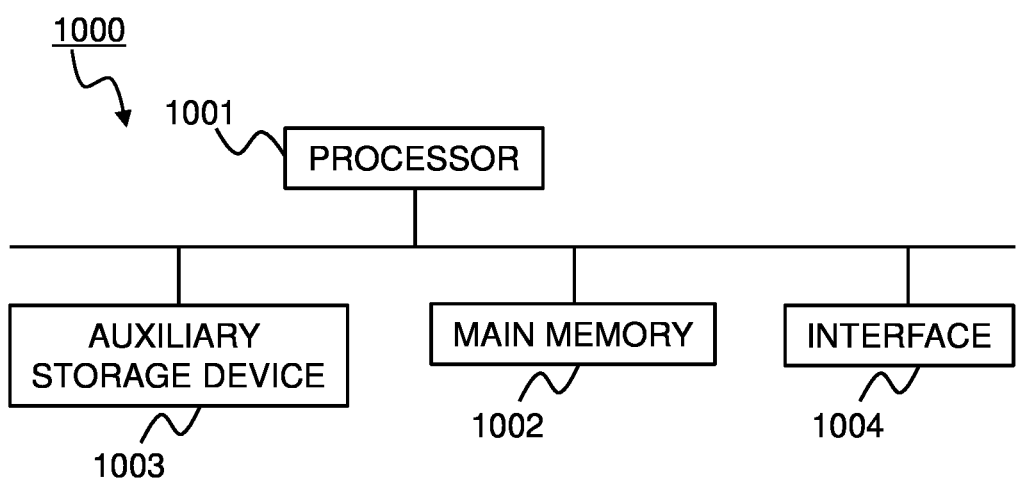
FIG. 7 It depicts a schematic block diagram illustrating the configuration of a computer according to at least one exemplary embodiment.

FIG. 7 is a schematic block diagram illustrating the configuration of a computer according to at least one exemplary embodiment. A computer 1000 has a processor 1001, a main memory 1002, an auxiliary memory 1003, and an interface 1004.

The adjustment system 80 described above is installed in the computer 1000. The operations of the above-mentioned processing units are stored in the auxiliary memory 1003 in the form of a program (adjustment program). The processor 1001 reads the program from the auxiliary memory 1003, expands the program into the main memory 1002, and performs the above processing according to the program.

In at least one exemplary embodiment, the auxiliary memory 1003 is an example of a non-transitory tangible medium. Other examples of non-transitory tangible media include a magnetic disk, a magneto-optical disk, a compact disc read-only memory (CD-ROM), a DVD-ROM (read-only memory), a semiconductor memory, and the like, which are connected via the interface 1004. In the case where the program is delivered to the computer 1000 via a communication line, the computer 1000 that receives the delivery may expand the program into the main memory 1002 and perform the above processing.

The program may also be used to implement some of the functions described above. Furthermore, the program may be a so-called difference file (a difference program), which implements the above-mentioned functions in combination with other programs already stored in the auxiliary memory 1003.

Some or all of the above exemplary embodiments may also be described as, but not limited to, the following Supplementary notes.

(Supplementary note 1) An adjustment system, including: an input unit that receives inputs of pre-change performance data acquired by a device before a change and post-change performance data acquired by the device after having undergone the change, through control using a first cost function; and an update unit that generates a second cost function obtained by updating the first cost function in such a way as to reduce a difference between the pre-change performance data and the post-change performance data, wherein the update unit generates the second cost function obtained by updating the first cost function by estimating an error that occurs in an output value of the device included in the first cost function before and after the change to the device.

(Supplementary note 2) The adjustment system according to Supplementary note 1, wherein the update unit generates the second cost function with a variable indicating the error in the output value of the device included in the first cost function being set and generates the second cost function by estimating the error after updating the variable in such a way as to reduce the difference between the pre-change performance dada and the post-change performance data.

(Supplementary note 3) The adjustment system according to Supplementary note 1 or 2, wherein the update unit generates the second cost function obtained by updating the first cost function by inverse reinforcement learning using the pre-change performance data and the post-change performance data.

(Supplementary note 4) The adjustment system according to Supplementary note 3, wherein the update unit repeats the process of updating the second cost function in such a way as to reduce the difference between the decision-making data obtained by optimizing the generated second cost function and the pre-change performance data.

(Supplementary note 5) The adjustment system according to any one of Supplementary notes 2 to 4, wherein the variable indicating the error in the output value of the device is one or both of a variable indicating a bias and a variable indicating a magnification parameter.

(Supplementary note 6) An adjustment method including: receiving inputs of pre-change performance data acquired by a device before a change and post-change performance data acquired by the device after having undergone the change, through control using a first cost function; generating a second cost function obtained by updating the first cost function in such a way as to reduce a difference between the pre-change performance data and the post-change performance data; and generating the second cost function obtained by updating the first cost function by estimating an error that occurs in an output value of the device included in the first cost function before and after the change to the device at the time of generating the second cost function.

(Supplementary note 7) The adjustment method according to Supplementary note 6, wherein the second cost function is generated with a variable indicating the error in the output value of the device included in the first cost function being set and the second cost function is generated by estimating the error after updating the variable in such a way as to reduce the difference between the pre-change performance dada and the post-change performance data.

(Supplementary note 8) A program storage medium for storing an adjustment program for causing a computer: to perform an input process of receiving inputs of pre-change performance data acquired by a device before a change and post-change performance data acquired by the device after having undergone the change, through control using a first cost function, and an update process of generating a second cost function obtained by updating the first cost function in such a way as to reduce a difference between the pre-change performance data and the post-change performance data; and to generate the second cost function obtained by updating the first cost function by estimating an error that occurs in an output value of the device included in the first cost function before and after the change to the device in the update process.

(Supplementary note 9) The program storage medium according to Supplementary note 8, for storing an adjustment program for causing a computer in the update process to generate the second cost function with a variable indicating the error in the output value of the device included in the first cost function being set and to generate the second cost function by estimating the error after updating the variable in such a way as to reduce the difference between the pre-change performance dada and the post-change performance data.

(Supplementary note 10) An adjustment program for causing a computer: to perform an input process of receiving inputs of pre-change performance data acquired by a device before a change and post-change performance data acquired by the device after having undergone the change, through control using a first cost function, and an update process of generating a second cost function obtained by updating the first cost function in such a way as to reduce a difference between the pre-change performance data and the post-change performance data; and to generate the second cost function obtained by updating the first cost function by estimating an error that occurs in an output value of the device included in the first cost function before and after the change to the device in the update process.

(Supplementary note 11) The adjustment program according to Supplementary note 10, for causing a computer in the update process to generate the second cost function with a variable indicating the error in the output value of the device included in the first cost function being set and to generate the second cost function by estimating the error after updating the variable in such a way as to reduce the difference between the pre-change performance dada and the post-change performance data.

Although the present invention has been described above with reference to the exemplary embodiments, the invention is not limited to the above exemplary embodiments. Various changes may be made in the composition and details of the present invention within the scope of the present invention, which can be understood by those skilled in the art.

REFERENCE SIGNS LIST

10 Trajectory data acquisition device
11 Performance data input unit
12 Data processing unit
13 Performance data storage unit
13a Post-change performance data
13b Pre-change performance data
20 Learning device
21 Training data input unit
22 Parameter estimation processing unit
23 Output unit
24 Parameter storage unit
100 Adjustment system
200 Adjustment target system
210 Control unit
211 Sensor
212 Actuator

What is claimed is:

1. An adjustment system, comprising:
a memory storing instructions; and
one or more processors configured to execute the instructions to:
receive inputs of pre-change performance data acquired by a control device before a change and post-change performance data acquired by a robot device after having undergone the change, the pre-change performance data and the post-change performance data obtained by controlling with a first cost function, the pre-change performance data being trajectory data in an ideal state with the control device operating without any problems;
set a variable to the first cost function, the variable indicating an error between an output value of the control device and an output value of the robot device;
estimate the error by updating the variable in such a way as to reduce a difference between the pre-change performance data and the post-change performance data;
generate a second cost function including the error estimated; and
control a movement of the robot device by driving an actuator of the robot device based on the second cost function.

2. The adjustment system according to claim 1, wherein the processor is configured to execute the instructions to generate the second cost function obtained by updating the first cost function by inverse reinforcement learning using the pre-change performance data and the post-change performance data.

3. The adjustment system according to claim 2, wherein the processor is configured to execute the instructions to repeat the process of updating the second cost function in such a way as to reduce the difference between the decision-making data obtained by optimizing the generated second cost function and the pre-change performance data.

4. The adjustment system according to claim 2, wherein the variable indicating the error in the output value of the robot device is one or both of a variable indicating a bias and a variable indicating a magnification parameter.

5. An adjustment method comprising:
receiving inputs of pre-change performance data acquired by a control device before a change and post-change performance data acquired by a robot device after having undergone the change, the pre-change performance data and the post-change performance data obtained by controlling with a first cost function, the pre-change performance data being trajectory data in an ideal state with the control device operating without any problems;
setting a variable to the first cost function, the variable indicating an error between an output value of the control device and an output value of the robot device;
estimating the error by updating the variable in such a way as to reduce a difference between the pre-change performance data and the post-change performance data;
generating a second cost function including the error estimated; and
controlling a movement of the robot device by driving an actuator of the robot device based on the second cost function.

6. A non-transitory computer readable information recording medium storing an adjustment program for causing a computer to perform a method comprising:
- receiving inputs of pre-change performance data acquired by a control device before a change and post-change performance data acquired by a robot device after having undergone the change, the pre-change performance data and the post-change performance data obtained by controlling with a first cost function, the pre-change performance data being trajectory data in an ideal state with the control device operating without any problems
- setting a variable to the first cost function, the variable indicating an error between an output value of the control device and an output value of the robot device;
- estimating the error by updating the variable in such a way as to reduce a difference between the pre-change performance data and the post-change performance data;
- generating a second cost function including the error estimated; and
- controlling a movement of the robot device by driving an actuator of the robot device based on the second cost function.

* * * * *